(12) United States Patent
Adler et al.

(10) Patent No.: US 11,004,318 B2
(45) Date of Patent: *May 11, 2021

(54) SYSTEMS AND METHODS FOR PROVIDING CRISIS AND EMERGENCY MANAGEMENT AND MONITORING

(71) Applicant: BLUE SYSTEMS A.Y. LTD, Naan (IL)

(72) Inventors: Asaf Adler, Naan (IL); Yonatan Sherizen, Shaalvim (IL); Eliran Amar, Kfar Saba (IL)

(73) Assignee: BLUE SYSTEMS A.Y. LTD, Naan (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/911,411

(22) Filed: Jun. 25, 2020

(65) Prior Publication Data
US 2020/0327787 A1    Oct. 15, 2020

Related U.S. Application Data

(63) Continuation of application No. 16/114,304, filed on Aug. 28, 2018, now Pat. No. 10,733,856.
(Continued)

(51) Int. Cl.
*H04L 29/06* (2006.01)
*G08B 13/196* (2006.01)
*H04N 21/2187* (2011.01)
*G08B 27/00* (2006.01)
*G08B 25/14* (2006.01)
(Continued)

(52) U.S. Cl.
CPC ... *G08B 13/1966* (2013.01); *G08B 13/19669* (2013.01); *G08B 13/19682* (2013.01); *G08B 13/19684* (2013.01); *G08B 25/016* (2013.01); *G08B 25/08* (2013.01); *G08B 25/14* (2013.01); *G08B 27/001* (2013.01); *H04N 21/2187* (2013.01); *G08B 7/066* (2013.01)

(58) Field of Classification Search
CPC .......... G08B 13/1966; G08B 13/19684; G08B 27/001; G08B 25/14; G08B 13/19682; G08B 25/016; G08B 25/08; G08B 13/19669; G08B 7/066; H04N 21/2187; H04N 7/188

See application file for complete search history.

(56) References Cited

U.S. PATENT DOCUMENTS

2013/0183924 A1* 7/2013 Saigh ................... A61K 31/198
                                                                     455/404.2
2014/0143851 A1* 5/2014 Baum ................. H04L 12/2807
                                                                        726/12

(Continued)

*Primary Examiner* — Howard D Brown, Jr.
(74) *Attorney, Agent, or Firm* — Alphapatent Associates, Ltd; Daniel J. Swirsky

(57) ABSTRACT

A security platform for real-time alerting, monitoring and managing ongoing security incidents in a locality such as an educational, religious, industrial or commercial center. Video and audio data gathering are combined to graphically present a security incident, enabling community or management to respond faster and more effectively and to provide a valuable tool for first responders. The platform integrates three components: smart sensors, mobile application and an intuitive presentation dashborad. The system further may provide instant mobile alerts and a navigation aid away from danger.

17 Claims, 13 Drawing Sheets

Related U.S. Application Data

(60) Provisional application No. 62/687,004, filed on Jun. 19, 2018, provisional application No. 62/550,777, filed on Aug. 28, 2017.

(51) Int. Cl.
| | | |
|---|---|---|
| *G08B 25/01* | (2006.01) | |
| *G08B 25/08* | (2006.01) | |
| *G08B 7/06* | (2006.01) | |

(56) References Cited

U.S. PATENT DOCUMENTS

2014/0316581 A1* 10/2014 Fadell ..................... F24F 11/30
　　　　　　　　　　　　　　　　　　　　　　　　700/276
2017/0124792 A1* 5/2017 Schoenfelder ..... G07C 9/00857
2018/0350225 A1* 12/2018 Siminoff ................ H04N 7/186

\* cited by examiner

SYSTEMS AND METHODS FOR PROVIDING CRISIS AND EMERGENCY MANAGEMENT AND MONITORING

CROSS-REFERENCE TO RELATED APPLICATIONS

This application is a continuation of U.S. patent application Ser. No. 16/114,304, filed Aug. 28, 2018, which claims the benefit of priority from U.S. Provisional Patent Application No. 62/550,777, filed Aug. 28, 2017, and U.S. Provisional Patent Application No. 62/687,004, filed Jun. 19, 2018, the contents of which are incorporated by reference in their entirety.

FIELD

The disclosure herein relates to providing crisis and emergency management, alerting and monitoring. In particular, but not exclusively, the disclosure relates to systems and methods of a security system for real-time alerting, monitoring and managing of onging security incidents in a populated locality such as an educational center, a school, a medical center, a religious center, a commercial or industrial center and the like, using various devices for gathering event related data.

BACKGROUND

Active shooting incidents have increased in recent years in the US, becoming severely more critical and fatal. In particular, schools, have been targeted frequently throughout the years by active shooters scenarios such as mass shootings, terrorist attacks and other public safety incidents, possibly because students and teachers are unarmed and are incapable of responding physically to the threat.

Even though there is no broadly accepted definition of a mass shooting/keeling, these violent acts ("mass shooting", "mass killings" or "attempted mass killings") in a populated locality, may refer to any such incident in which three/four or more people are shot/killed/injured.

According to an FBI report, active shooters increased in the last two years reporting of 50 active shooters; 1000 persons killed or injured; and in average, 1 school shooting per week. Further, according to various related organizations of gun data collecting (Gun Violence Archive, Everytown for Gun Safety and more) 476 mass shooting occurred in the US in 2016, 142 school shooting in the US occurred from 2013-2015. Five months into 2018, there have been 16 shootings at US schools and generally 101 mass shootings. Further, police response may be delayed and may take over 10 minutes average time before police or associated forces arrive.

Existing security features, such as access control and video surveillance are important tools helping of deterring these scenarios, but to some extent only. Such life-threatening incidents, especially the first critical minutes are commonly associated with panic causing confusion and chaos.

The need remains therefore, for a smart security solution for managing a security incident in real-time occurring in a populated area such as an educational center, a school, a commercial site and the like. The invention described herein addresses the above-described needs.

SUMMARY

The current disclosure addresses various aspects of a crisis and emergency alerting and monitoring platform for managing security incidents in real-time.

According to one aspect of the presently disclosed subject matter, there is provided an emergency management, alerting and monitoring platform operable to perform security event analysis of a locality including at least one building, the emergency management and monitoring platform including a control unit network including at least one shield control unit configured to gather security event related data at a sub-locality to provide at least one event related feed, a security backend control system operable to communicate with the at least one shield control unit, and a security frontend system including at least one presentation dashboard operable on a computing device in communication with the security backend control system, where the emergency management and monitoring platform is operable to receive triggered indications and further to perform security analysis in an automatic manner to provide real-time alerting, monitoring and managing of at least one ongoing security incident, and where the security backend control system includes a pertinent data selection module operable to select pertinent data and to provide the peritinent data to the security frontend system such that the at least one presentation dashboard displays a simplified graphical interface.

As appropriate, the at least one shield control unit, includes a wide-angle camera having night vision capabilities, the camera operable to transmit video to the security backend control system, a communication unit operable to use at least one communication technology, a microcontroller operable to execute an installed software module, a power unit component operable to power the at least one shield control unit, and a memory unit component for storing data associated with the at least one ongoing security incident.

As appropriate, the at least one communication technology is selected from a group consisting of a universal asynchronous receiver-transmitter (UART) technology, Ethernet technology, Wi-Fi technology, infrared communication, ultrasonic transmission, audio transmission and combinations thereof.

As appropriate, the computing device is selected from a group consisting of a personal computer, a laptop computer, a tablet, a smartphone device, a portable handheld device and combinations thereof.

As appropriate, the at least one shield control unit includes at least one audio interface, where the at least one audio interface includes at least one of a microphone operable to transmit local sound to the security backend control system, a speaker operable to deliver messages and alarms, an audio signaling device selected from a group consisting of a buzzer, a beeper, a bell, a bleeper, a chirper and combinations thereof, and a sonic communication channel for communicating with local communication devices.

As appropriate, the security backend control system is operable to communicate with at least one shield control unit via at least one master shield control unit.

Optionally, the security backend control system is operable to communicate with the at least one shield control unit directly.

As appropriate, the shield control unit is operable in at least one operation state selected from a group consisting of a startup state, a setup state, a BIT state, a sleep state, an event state, an error state and combinations thereof. Where the startup state allows to activate the shield control unit, where the setup state allows to set configuration of the shield control unit, where the BIT state is operable to perform communication topology testing, where the sleep state allows transmitting of a "keep alive" signal, where the error state indicates lack of communication, and where the event state allows transferring live video, audio and sensor data to the security backend control system.

As appropriate, the at least one shield control unit includes at least one external interface operable to communicate with the external environment, the at least one external interface selected from a group consisting of a mechanical interface, an electrical interface, a software interface and combinations thereof.

As appropriate, the at least one shield control unit is configured to change into the event state upon receiving an external trigger command selected from a group consisting of a mechanical command via a "panic" button mounted on the at least one shield control unit, an administrator initiated wireless command indication, and an internal Artificial Intelligence (AI) software module signal command.

As appropriate, the at least one shield control unit is operable to provide at least one visual informational indication. Accordingly, the at least one visual informational indication uses a LED indicator, where the LED indicator is operable to provide at least one visual coded indication selected from a group consisting of a color-coded light indication, a frequency coded blinking, a number of coded blinks, a duration of coded flushes and combinations thereof.

Optionally, the at least one shield control unit is configured to record video and audio for storing in the memory unit.

Optionally, the at least one shield control unit is accessible via a USB connector.

Optionally, where the at least one shield control unit is identified by a QR code.

Where appropriate, the at least one shield control unit including at least one sensor selected from a group consisting of a temperature sensor, a smoke sensor, a humidity sensor, a sound sensor, a Carbon mono-dioxide sensor, a motion sensor, a light sensor and combinations thereof.

Where appropriate, the at least one master shield control unit is connectable via a dedicated software application.

According to another aspect of the presently disclosed subject matter, there is provided a method for use in an emergency management and monitoring platform operable to perform field analysis of an ongoing security event at a locality including at least one building, in an improved manner, the emergency management and monitoring platform including a control unit network including at least one shield control unit, a security backend control system including a pertinent data selection module and further operable to communicate with the at least one shield control unit, and a security frontend system including at least one presentation dashboard in communication with the security backend system, the method including the steps of receiving a plurality of field data indications gathered by the at least one shield control unit, analyzing the plurality of field data indications to determine real-time occurrence of the security event at the locality, and selecting pertinent data for continual simplified display on the at least one presentation dashboard.

Accordingly, the method further including a step of determining an initial setup of the emergency management and monitoring platform, by distributing the shield control units network within the locality, determining communication configuration of associated components of the emergency management and monitoring platform, entering each the shield control unit into "sleep" mode, verifying an appropriate pinging process with each shield control unit, and presenting a simplified user interface (UI) via which a security administrator is able to control and monitor the locality.

As appropriate, the step of analyzing the plurality of field data indications, including the steps of transmitting at least one control command to the at least one shield control unit, receiving at least one field data indication from the at least one shield control unit, mapping region around the at least one shield control unit, and presenting continuously a simplified visual display of the locality via which a security administrator is able to control and monitor the locality.

As appropriate, the step of receiving at least one field data indication, includes at least one of the steps receiving a mechanical indication triggered by pressing a "panic" button mounted on each shield control unit, receiving at least one administrator wireless command indication, receiving at least one internal Artificial Intelligence (AI) software module indication, receiving at least one audio signal indication from the at least one control unit, receiving at least one video signal indication from the at least one control unit, and receiving at least one sensor data indication.

As appropriate, the pertinent data comprising navigation data to allow exiting safely from the locality.

BRIEF DESCRIPTION OF THE DRAWINGS

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the several selected embodiments may be put into practice. In the accompanying drawings.

DETAILED DESCRIPTION

Figure 1:
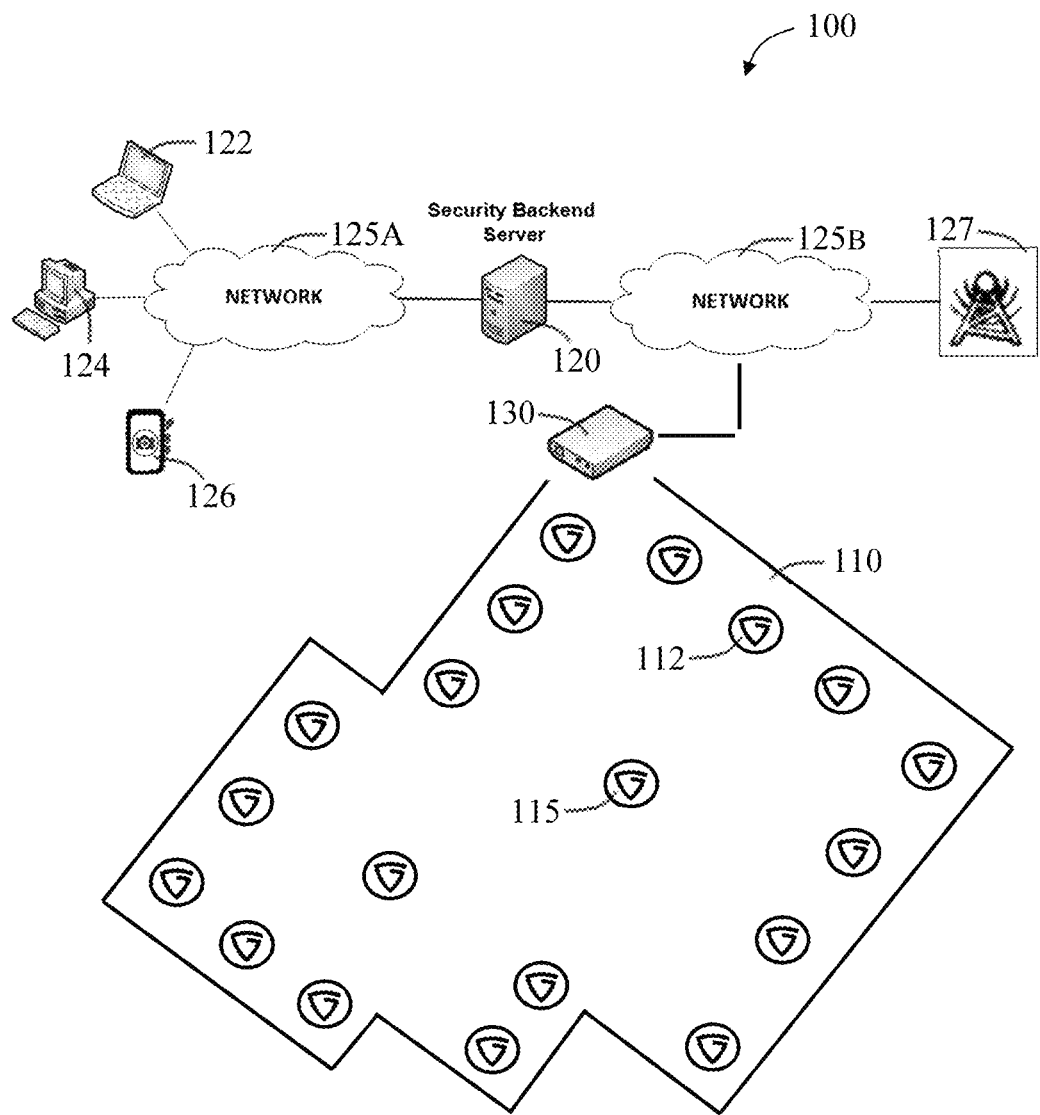
FIG. 1 is a schematic block diagram representing select components of a possible client-server architectural setting of an emergency management and monitoring platform according to one embodiment of the current disclosure.

Aspects of the present disclosure relate to systems and method for crisis and emergency management and monitoring. In particular but not exclusively, the disclosure relates to security systems for real-time monitoring of an ongoing emergency event occurring in a populated area, such as a community populated locality, comprising at least one building, for example sized educational centers, commercial sites, place of prayer and the like.

Accordingly, a platform is introduced to provide an emergency management system operable to use various shield control devices to gather emergency event related data such as video and audio information and more. The platform further includes a GUI based presentation and a controlling system. The emergency management system may further function as a communication hub to allow rapid communication between parties involved in the event.

The emergency management system, as described hereinafter, is operable to control and monitor an advanced network of shield control devices to safeguarding and restoring calm to public spaces and protecting the community.

The emergency management system of the current disclosure enables the community to respond more effectively and faster to emergency or crisis incidents and to provide a valuable tool for first responders to emergency or crisis incidents. The system further provides an intuitive help tool to people and operable to provide instant mobile alerts and notification and may further serve as a navigation aid directing subjects out of a dangerous locality.

Additionally, the emergency management system may further provide situational awareness to enable sharing of critical information. Situational awareness may be provided from live intelligence feeds provided by the emergency management. Accordingly, crisis management may keep the various parties in constant contact, and further provide an intuitive crisis management system helping to guide others to safety quickly.

It is noted that the current disclosure integrates at least three components: smart sensors, mobile application and intuitive presentation dashborad In various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally or alternatively, the data processor may access a non-volatile storage, for example, a magnetic hard-disk, flash-drive, removable media or the like, for storing instructions and/or data.

It is particularly noted that the systems and methods of the disclosure herein may not be limited in its application to the details of construction and the arrangement of the components or methods set forth in the description or illustrated in the drawings and examples. The systems and methods of the disclosure may be capable of other embodiments, or of being practiced and carried out in various ways and technologies.

Alternative methods and materials similar or equivalent to those described herein may be used in the practice or testing of embodiments of the disclosure. Nevertheless, particular methods and materials are described herein for illustrative purposes only. The materials, methods, and examples are not intended to be necessarily limiting.

As used herein, UART refers to a Universal Asynchronous Receiver or Transmitter, which is a piece of computer hardware that translates data between parallel and serial forms. UARTs are regularly used with communication standards such as EIA, RS-422, RS-232 or RS-485.

As used herein, LTE refers to a "Long Term Evolution", which is a 4G wireless communications standard developed by the 3rd Generation Partnership Project (3GPP) that is designed to provide up to 10× the speeds of 3G networks for mobile devices such as smartphones, tablets, netbooks, notebooks and wireless hotspots.

As used herein, BLE refers to Bluetooth Low Energy (Bluetooth LE), which is a wireless personal area network technology designed and marketed by the Bluetooth Special Interest Group (Bluetooth SIG) aimed at novel applications in the healthcare, fitness, beacons, security, home entertainment and the like.

As used herein, ESD refers to Electrostatic discharge, which is the release of static electricity when two objects come into contact.

As used herein, ADC refers to "Analog-to-Digital Converter", since computers only process digital information, they require digital input. Therefore, if an analog input is sent to a computer, an analog-to-digital converter (ADC) is required.

As used herein, LED refers to a "light-emitting diode", which is a semiconductor device that emits light when an electric current is passed through it.

As used herein, an SD Card refers to a Secure Digital Card, which is a non-volatile memory card format used for storing digital information in portable devices.

Description of the Embodiments

The emergency management and monitoring platform, of the current disclosure, is operable to perform security event analysis of a locality, commonly comprising at least one building. The emergency management and monitoring platform includes a control unit network comprising at least one shield control unit configured to gather security event related data at a sub-locality to provide at least one event related feed, a security backend control system and a security frontend control system. The security backend control system is operable to communicate with the control unit network and the security frontend system comprising at least one presentation dashboard operable on a computing device which communicates with the security backend control system.

It is particularly noted that the emergency management and monitoring platform is operable to receive triggered indications and further perform security analysis in an automatic manner to provide real-time monitoring and managing of at least one ongoing security incident. It is further emphasized that the security backend control system comprises a pertinent data selection module which is operable to select pertinent data and to provide the pertinent data to the security frontend system such that the associated presentation dashboard displays a simplified graphical interface, especially accountable for situation with under stress.

Simplicity and Ease of Use

It is noted that a key feature of the introduced emergency system is a pertinent data selection module operable to provide pertinent data, such that the necessary information only is presented in a simplified graphical manner with easy to read GUI so that people under high stress and pressure may find the system easily operable during crisis and emergencies. Furthermore, the emergency management system may include advanced features that may function as a navigation aid for directing victims safely away from the scene of a security incident. To this end, associated usage may be made of a machine learning engine to filter information from multiple sources so that it can be presented in a simplified form on the GUI.

Data Filtering Mechanism

In order to provide a simplified user interface a data filtering system may be provided including a filtering mechanism for applying a plurality of data filters. For example artificial intelligence systems may generate filtering functions for receiving data for example via chatbots, sensors, real time witnesses, and the like. Data provided to the filtering system may be processed such that only data pertinent to the immediate requirements of a user may be presented.

For example, a dynamic map may be provided clearly identifying the active region of a security events and possible safe routes of escape for those caught in the event.

Similarly emergency services may be presented in real time with only the information they need for example the locations of the injured as well as safe routes to them.

As the event unfolds overtime, historical data is stored such that changes to the map may be viewed as required.

The emergency management and monitoring platform may include various devices, with the shield control unit network comprising at least one standalone shield unit including, with wireless power source and wireless communication capabilities. The standalone shield units are easily installable and easily handled. The standalone shield unit may operate in various operation modes/states such as sleep mode, event mode, setup mode and more, where sleep mode and event mode may be the operational modes. While in sleep mode, the standalone shield unit may be configured to transfer a "keep alive" signal during ordinary state, ready to receive emergency incident indications and move into the event mode. In event mode, the standalone shield unit may transfer video to the backend system and further enable bidirectional sound functionality. Additionally or alternatively, the standalone shield unit may transmit data gathered from additional system sensors such as smoke sensor, temperature sensor, motion sensors and the like.

Where appropriate, there may be various possible triggering mechanisms for each standalone shield unit to change state from sleep state into event state, including, but not limited to: pressing a unit "panic button", administrator transmitting a wireless command directed to the standalone shield unit and Artificial Intelligence (AI) signals from the software system. The data gathered while in event state may be stored in a memory card of the shield unit.

Simplified Dashboard Functionality:

Existing security features focus mainly on access control and video surveillance to provide a partial solution. The current disclosure caters for a comprehensive solution to cover the critical technological gap with the belief that technology can reduce confusion and help save lives in a growing range of public safety threat.

The current disclosure is operable to provide instant awareness with real-time crisis management via a simplified dashboard serving as a centralized control panel as a key feature of the system. Specifically, the system is operable to receive a plurality of field data indications gathered by a network of shield control units, to analyze the field data indications to determine real-time occurrence of a security event at a locality. In particular, the system selects pertinent data for continual simplified display on at least one presentation dashboard. The presentation dashboard provides a simplified user interface (UI) via which a security administrator is able to control and monitor the security incident at the locality.

Further, the simplified dasboard functionality focuses on receiving and displaying relevant data using the pertinent data selection module to provide direct video/audio, dynamic site map manageable and monitored via a centralized control panel.

It is noted that the step of analyzing the plurality of field data indications comprising the steps of transmitting at least one control command to at least one shield control unit; receiving at least one field data indication from the at least one shield control unit; mapping region around the at least one shield control unit; and presenting continuously the simplified visual display of the locality via which a security administrator is able to control and monitor said locality.

Reference is now made to FIG. 1, in which there is provided a schematic block diagram representing a possible client-server architectural setting of an emergency management and monitoring platform, which is generally indicated at 100. The system may be operable to perform security event analysis of a locality (see FIG. 2) comprising at least one building, according to one embodiment of the current disclosure.

The emergency management and monitoring platform 100 includes a control unit network, arranged according to a layout of a locality 110 operable to gather security data, a security backend control system operable to communicate with the control unit network via a communication device 130 and a security frontend control system comprising at least one presentation dashboard operable on a computing device (122, 124, 126) and used by a system administrator or a coordinator of the associated security incident.

The control unit network includes at least one shield control unit arranged according to locality layout 110 and each shield control unit is gathering data in its sub-locality, thereafter transmitting at least one event related feed to the security backend control system 120. It is noted that the security backend control system 120 is operable to communicate with each shield control unit, such as 112 directly, or via a master shield control unit, such as 115.

It is particularly noted that the emergency management and monitoring platform 100 is operable to receive triggered indications and further to perform security analysis in an automatic manner to provide real-time monitoring and managing of at least one ongoing security incident. Additionally, the security backend control system 120 comprises a pertinent data selection module operable to select pertinent data and to provide the pertinent data to the security frontend system such that the at least one presentation dashboard displays a simplified graphical interface.

It is noted that to achieve good quality performance, the maximum distance between shields units may be limited, where necessary, such as not to exceed 50 meters, depending on locality layout. Additionally, in certain system the number of units may be limited with no more than 99 shield units, say being distributed with maximum of 30 shield units for a master shield unit.

It is noted that the dashboard, the command and control center, is operable to perform setting of the locality visualized map, uploading the locality image and placement of each control shield as distributed.

The dashboard is operable to perform users' setup, various system checks and event handling and management, including Start/Share/Stop Event; Online chat (using Chat-Bot); dynamic map; Video/Audio streaming (shields and applications); and PA system. Additionally, the dashboard is operable to display statistics and provide provisions for AI implementation.

It is further noted that the native software applications (such as iOS, Android or the like) are configured to allow User Registration; Shields Setup; and Event handling, such that the following tasks may be performed: Start/Share/Stop Event; Online chat; Dynamic map; Video/Audio streaming (to the Dashboard); and PA system (controlling)

Figure 2:
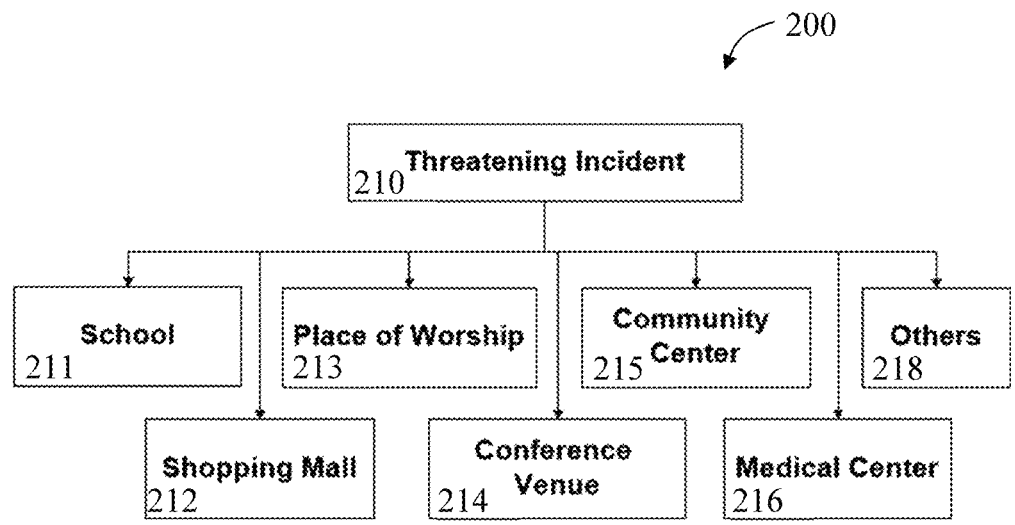
FIG. 2 is another schematic diagram representing some localities that may suffer from an emergency or a threatening security incident according to one embodiment of the current disclosure.

Reference is now made to FIG. 2, in which there is provided a schematic diagram representing localities that may suffer from an emergency or a threatening security incident, which is generally indicated at 200, thus, requiring an immediate response to the emergency situation. The threatening security incident 210 may apply to an educational center such as a campus or a school 211, a commercial center such as a shopping mall 212, a religious center such as a place for worship 213, a conference venue 214, a community center 215, a medical center 216 such as hospitals, regional clinics and others possible localities.

Figure 3:
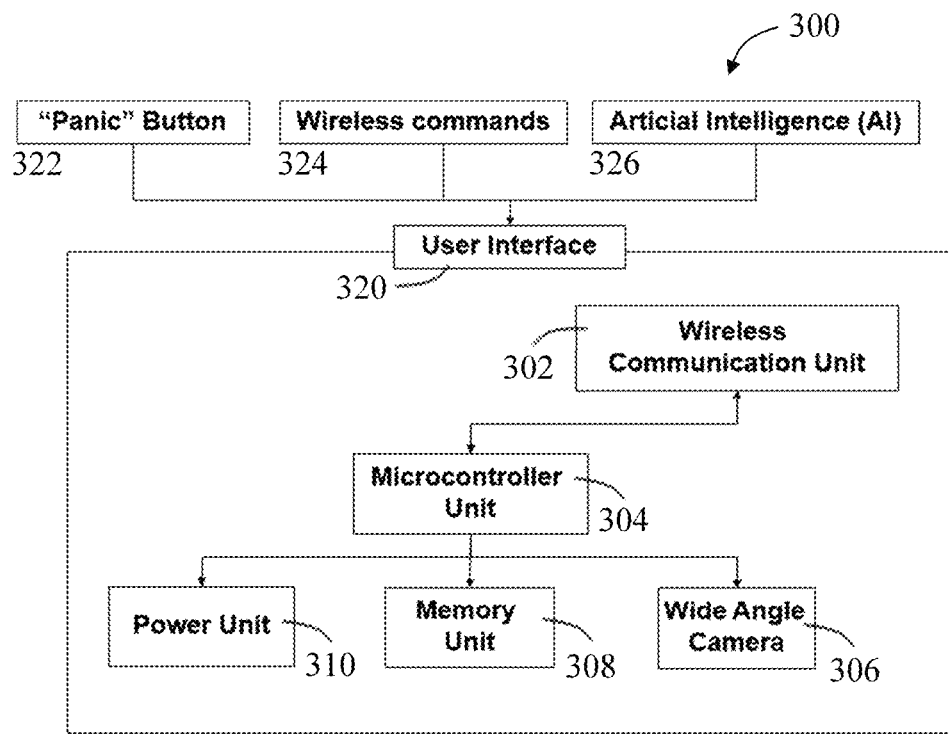
FIG. 3 is a schematic block diagram representing main components of a possible shield control unit for use in an emergency management and monitoring platform according to one embodiment of the current disclosure.

Reference is now made to FIG. 3, in which there is provided a schematic block diagram representing the main components of a shield control unit for use in an emergency management platform, which is generally indicated at 300, for gathering event related emergency data at a sub-locality to provide at least one event related feed, according to one embodiment of the current disclosure.

The shield control unit 300 consists of a communication unit 302 operable to use at least one communication technology, a microcontroller 304 operable to execute Software module installed thereupon and a wide-angle camera 306. The shield control unit 300 further includes a memory unit 308 for storing data associated with the at least one ongoing emergency incident; and a power unit component 310 operable to power the shield control unit 300.

The communication unit 302 may be operable to use technologies, such as, in a non-limiting manner, a universal asynchronous receiver-transmitter (UART) technology, Ethernet technology, Wi-Fi technology, infrared communication, ultrasonic transmission, audio transmission.

The wide-angle camera 306 is may be configured for night vision capabilities and operable to transmitting video to the emergency backend control system.

The power unit component 310 may use a rechargeable battery, a supercapacitor, a photovoltaic cell and the like.

It is noted that each standalone shield control unit may receive a triggering indication to move the unit from sleep mode into event mode, via a user interface mechanism 320 by, for example, pressing the unit's emergency (panic) button 322, transmitting wireless commands 324 submitted by the system administrator using a communication interface technology, Artificial Intelligence (AI) signals 326 and more.

Figure 4:
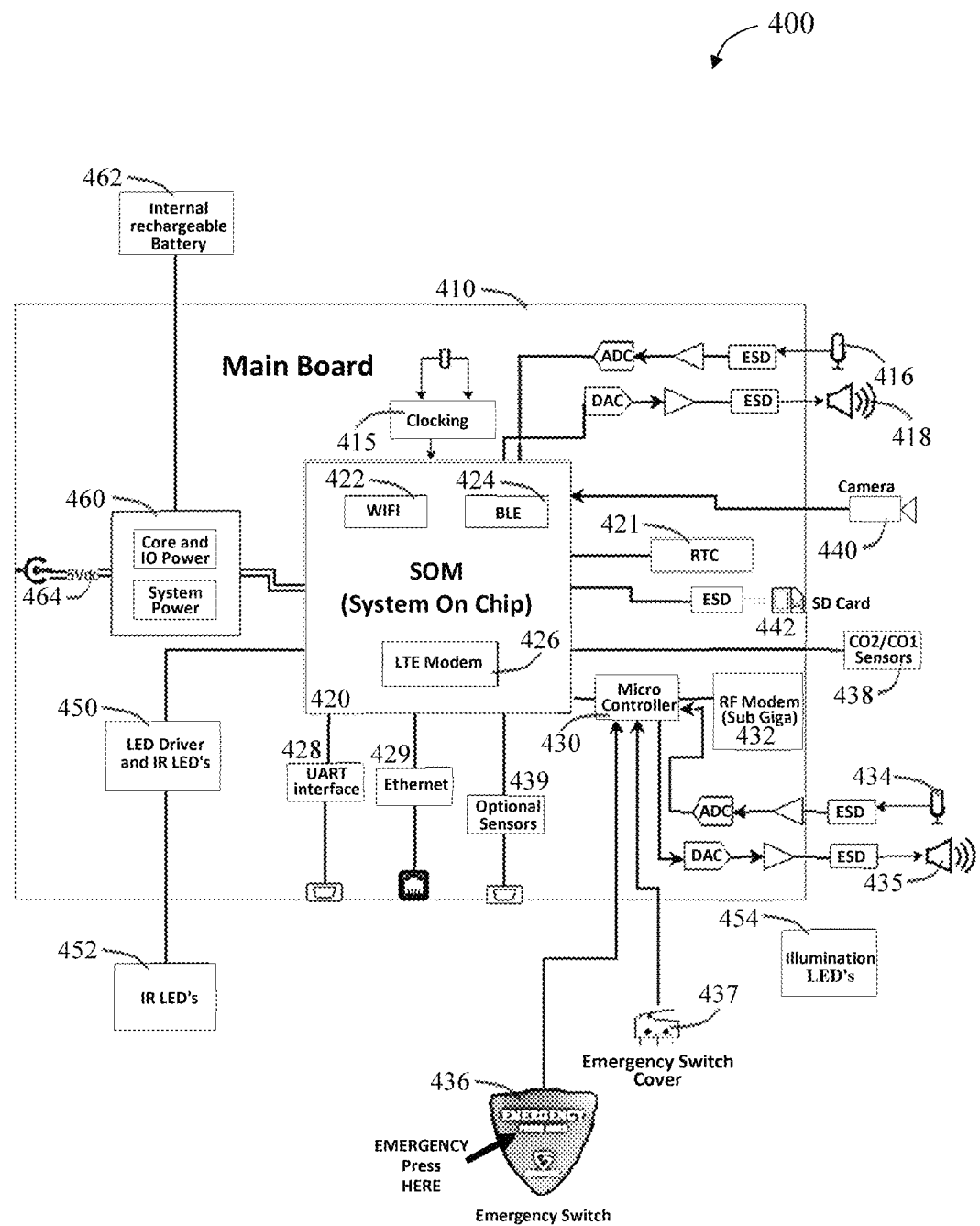
FIG. 4 is still another schematic block diagram representing components of another possible shield control unit for use in an emergency management and monitoring platform according to one embodiment of the current disclosure.

Reference is now made to FIG. 4, in which there is provided a schematic block diagram representing a possible detailed structure of a shield control unit for use in an emergency management platform, which is generally indicated at 400, for gathering event related emergency data at a sub-locality to provide at least one event related feed, according to one embodiment of the current disclosure. The shield control unit 400 represents one component of a distributed shield control network (unit 112, FIG. 1), operable to communicate with an emergency backend system, directly or via a master control unit (unit 115, FIG. 1).

By way of example, in a non-limiting manner, the shield control unit 400 consists of a main board 410 with a SOM (System on Module) unit 420, a wide-angle camera 440 operable to transmit video to the emergency backend control system (120, FIG. 1), a microcontroller 430 operable to execute the embedded system software installed thereupon, a wireless communication unit supporting UART interface 428 for software updates and Ethernet 429 for control center communications, and further operable to use: a 4G/LTE Modem 426 for control center communication (including video), a Wi-Fi Modem 422 for control center communication (including video), RF Transmitter/Receiver module for commands communication and a BLE 424 for use with an indoor positioning system. The shield control unit 400 further includes a power unit 460 operable to power the shield control unit 400, with a Core and JO Power component and a system power component driven by an internal rechargeable battery 462, for example a rechargeable lithium ion of 3.6V dc @ 13 Ah, and also may use a 5 Vdc external supply 464 for battery charge and unit power supply. In some embodiments, the battery life at sleep mode may be expected to last two years while in event mode it may be operable for two hours.

Note—wherein said control center communication refers to communication with the emergency backend control system (120, FIG. 1).

The shield control unit 400 is further configured to interface with the external environment by using various mechanical and electrical interfaces, mainly the emergency button 436, referred to as panic button, triggering the system into event mode. The unit 400 may further use visual informational indication of a LED indicator driver 450 operable to provide at least one visual coded indication (using IR LEDs 452 or illumination LEDs 454) selected from a group consisting of: a color-coded light indication, a frequency coded blinking, a number of coded blinks, a duration of coded flushes and combinations thereof.

For example, LED indication for Emergency (including drills) may be coded as Blue/White with frequency of pulse of 100 beats per minute displaying alternating colors; Emergency over may be indicated with Green light, no pulses; Yellow color may be indicating an alert for emergency with frequency of pulse of 60 beats per minute; Battery low during emergency may be indicated by color Red with frequency of pulse of 100 beats per minute and so on.

The shield control unit 400 is further configured for Audio Indication using a microphone for transmitting sound to control center such as 416, 434 and a speaker for delivering messages and alarms, such as 418 and 435. For example, the microphones 416, 434 may be configured for monitoring 5-25 Khz; and the speakers 418, 435 may be a built-in speaker with up to 80 db fire-alarm grade capability.

The shield control unit 400 is further configured to record video and audio for storing in the memory card unit 442 such as Micro SD/SDHC/SDXC up to 32 GB.

The shield control unit 400 is identified by a QR code and further connectable via a USB connector. Additionally or alternatively, the shield control unit 400 is connectable via a micro USB connector.

The shield control unit 400 is further configured to use at least one Carbon mono-dioxide sensor (438) and optionally various other sensors (439) selected from a group consisting of: a temperature sensor, a smoke sensor, a humidity sensor, a sound sensor, a Carbon mono-dioxide sensor, a motion sensor, a light sensor and combinations thereof.

Additionally or alternatively, the wide-angle camera 440 may be configured variously, for example: camera type is of at least 2MP indoor; configured with image sensor of 1/2.8" 2MP CMOS sensor; horizontal view angle: 103°-160° field of view; Lens: Fixed 3.6 mm, F2.0; IR working distance: 7 m effective range in complete darkness; Day/Night function: Mechanical IR cut filter, light sensor.

The emergency control platform may support Video streaming configured with: simultaneous motion H.264; controllable frame rate and bandwidth; support unicast (Real Time Streaming Protocol); frame rate: 15-20 FPS; and H.264: up to 20 fps at 1920×1080. Further support video compression for motion JPEG and H.264 baseline/main profile/high profile; and resolution for Motion H.264: 2 Profile from 1920×1080 to 320×240 (total 5 resolutions), and 2 Profile from 640×480 to 320×240 (total 3 resolutions).

Figure 5:
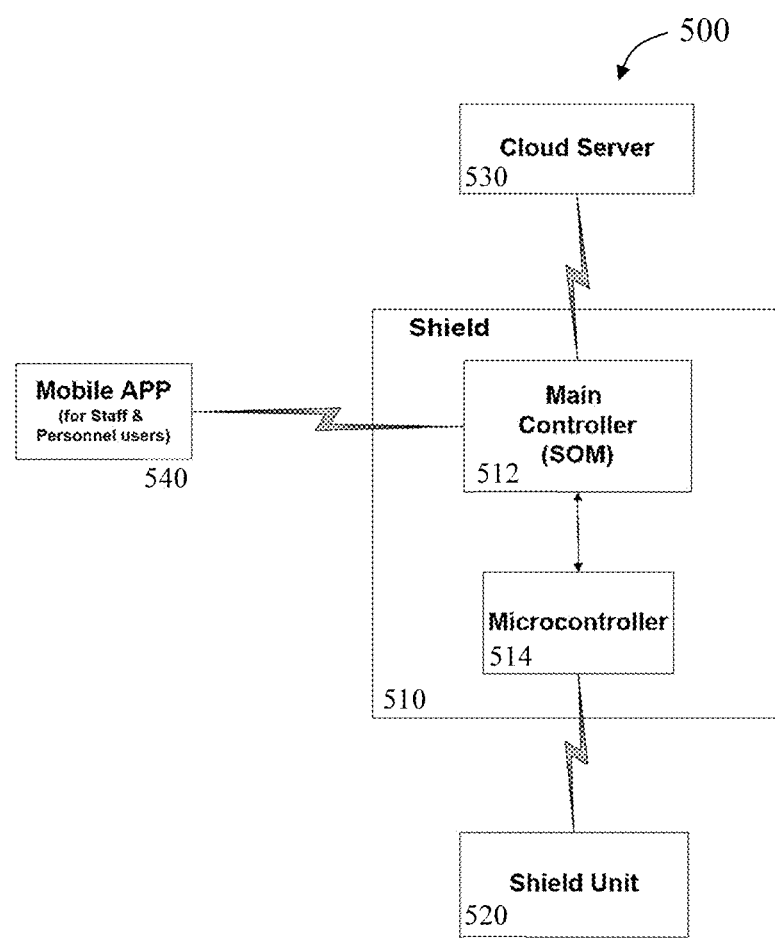
FIG. 5 is a schematic block diagram representing a possible shield control software system for use in an emergency management platform for providing the necessary functionality of the system according to one embodiment of the current disclosure.

Software Architecture & Flow:

Reference is now made to FIG. 5, there is provided a schematic block diagram representing a possible shield control software system for use in an emergency management platform, which is generally indicated at 500, for providing the necessary functionality of the system for gathering event related emergency data at a locality and to allow management and control of a security event, according to one embodiment of the current disclosure.

It is noted that the main purpose of the controller 512 is to perform the communication to the security backendend control system 530 and further with the microcontroller 514.

The software system of the emergency management and monitoring platform is operable to execute the following functionality: activating the shield control units main modes of operation—event mode and sleep mode; perform control and first level safety activities; adapt modes according to panel switches, sensors readings of sensing data; perform the communication with the platform backend system and the frontend dashboard; the master shield control unit; the associated mobile application; and save data to memory.

The main controller software is operable to manage and control the hardware subsystems; perform system initialization; perform normal system operation; execute controller tasks including controller commands and events; monitoring of system condition and performance; error handling—varieties of alarms and responses that must be supported; and provide user statistics.

By way of example, it is noted that the shield unit main controller 512 is configured as a slave unit to the main application executed and controlled by the could server 530. The main controller 512 may be activated by a predefined set of control commands. Additionally, the main controller 512 may request and report the main application by a predefined events messages.

The microcontroller 514 (430, FIG. 4) is operable to execute the embedded system software installed thereupon. The software system provides the interfaces with the main controller I/O's 512 and with the safety complex programmable logic device (CPLD).

The applicable communication interfaces provides for software interfacing of the main controller 512 with the cloud server 530 (interchangeably used; the security backend control system 120, FIG. 1) via the LTE modem (426, FIG. 4) and further via WIFI network and Ethernet technology.

The communication interfaces further provides for software communication with a mobile application 540 operable to serve staff personnel at field, for example, via intranet Wi-Fi network using BLE (424, FIG. 4) and further to provide IPS service.

It is noted that the software system communicates with the shield control unit 520 at field via RF (sub giga) modem. Additionally, the software communicates with a USB port, and SPI/I2C for sensors readings.

Software Updates:

The software system is configured such that remote software updates are available through Wi-Fi/LTE network and may be initiated via server control commands. Additionally, the backend system is configured to send the coordinator unit a "software update command", subsequntially, the coordinator may send the end-point units an associated "software update command".

Specifically, for the shield coordinator unit, the software system is operable to download data for software update and save it on flash memory.

Optionally, the software system may initiate software update at STM.

Optionally, the software system may initiate software update at ARTIK SOM.

Specifically, for the shield control unit, STM software may trigger wakeup to ARTIK SOM.

Optionally, the software system is operable to download data for software update and save it on flash memory.

Optionally, the software system may initiate software update at STM.

Optionally, the software system may initiate software update at ARTIK SOM.

Network Topologies/States:

The shield control unit, as described hereinabove, is a standalone unit with wireless power source and wireless communication capabilities. The unit is configured to function in two major operational modes—sleep mode and event mode controllable by the software module installed.

The wireless communication mechanism includes the following wireless modules: a Wi-Fi dual band (2.4 GHz and 5 GHz) module, an LTE Modem, a Bluetooth BLE and an RF sub giga transmitter.

Figure 6A:
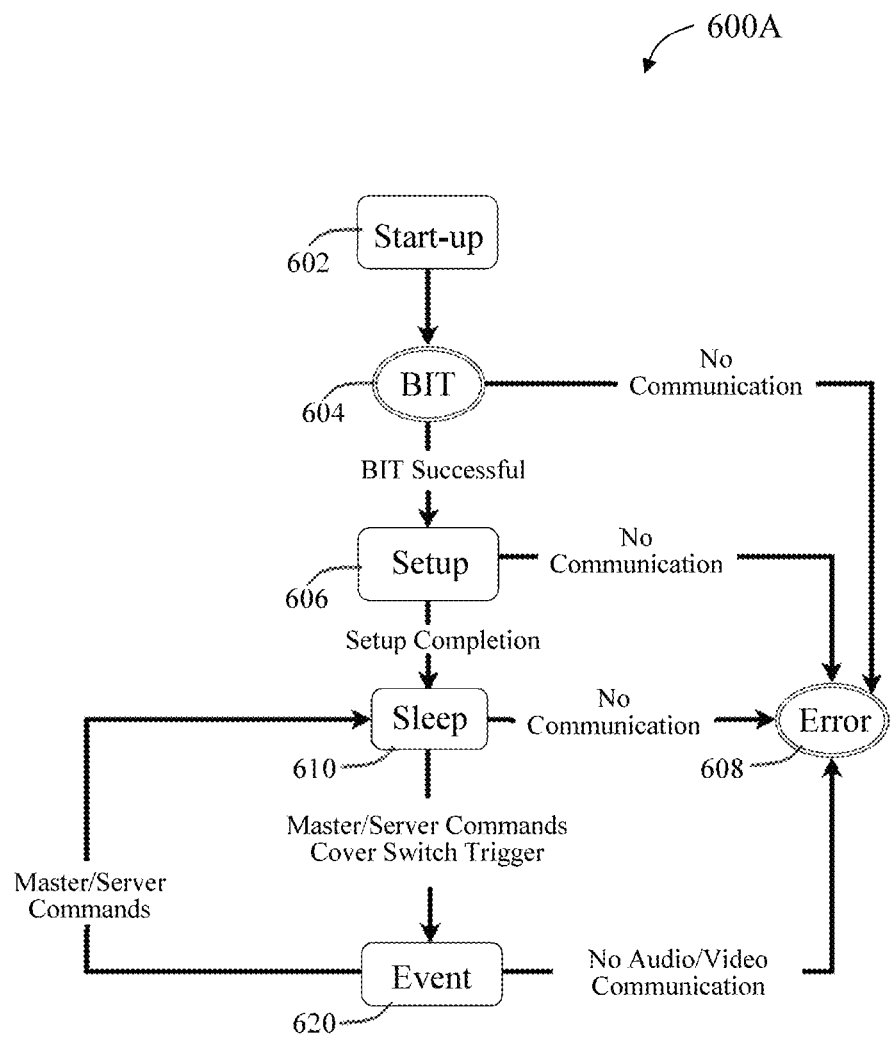
FIG. 6A is a schematic block diagram representing selected components of a radio frequency module network topology for use in an emergency management and monitoring platform according to one embodiment of the current disclosure.

Reference is now made to FIG. 6A, there is provided a flowchart representing a selected possible operational flow diagram, which is generally indicated at 600A, representing functional/operational states of a shield control unit. The system controller software (see FIG. 4) is operable to control the hardware components of a shield control unit, essentially performing the communication to the emergency cloud server and further communicate with the shield unit microcontroller.

The shield control unit is configured with six different functional states, supporting a startup state 602, a setup state 604, a BIT state 606, a sleep state 610, an event state 620 and an error state 608, where the sleep state 610 and the event state 620 represent the operational states.

In step 602, the startup state—on power-up of the shield control unit, allows activation of the unit and further setting a state to BIT state 604 to perform communication topology testing, and upon completion, change state to setup state 606 to allow setting the configuration of the shield control unit;

In step 604, the BIT state—while in BIT state 604, the system software automatically turns ON, for a period of two seconds, the unit speaker, the front panel LEDs, the side panel LEDs, the emergency switch LED and the error LED. Thereafter, the system software is operable to perform the following tests and enter error state 608 in case any test fails, during BIT:

A SOM and STM communication test via LTE: during this test, the system software may initiate Hand Shake to STM; if an appropriate response from STM is not detected, the system software may set an error indication and stop all operations.

A SOM and Server communication test: during this test, the system software may initiate Hand Shake to STM; if an appropriate response from STM is not detected, the system software may set an error indication, move to error state 608 and stop all operations.

A cyclic redundancy check (CRC) test: if the CRC test fails, the system software may set an error indication, move to error state 608 and stop all operations.

An SD card test: if the SD card test fails, the system software may set the error indication, change state to error state 608 and stop all operations.

Upon successful completion of the above set of tests, the system software may exit BIT state and enter setup state.

In step 606, the setup state—upon successful BIT, while in setup state 606, shield control unit may have an initial setting and may further continue to connect the specific unit to the emergency server and associate the unit with the online map of the locality (such as a school, shopping mall and the like). The process may use scanning of a QR code to provide a unique identification of the unit for the various system components.

In step 608, the error state—while in error state 608 indicating lack of communication, thus all operations are stopped;

In step 610, the sleep state—change state upon setup 906 completion. While in sleep state 610 wherein the sleep state allows transmitting of a "keep alive" signals according to ping protocol, every, say 10 seconds.

In step 620, while the event state—change to this state upon receiving a trigger indication. While in event state, the system allows transferring live video, audio and sensor data to the security backend control system for monitoring and management of the security incident.

Figure 6B:
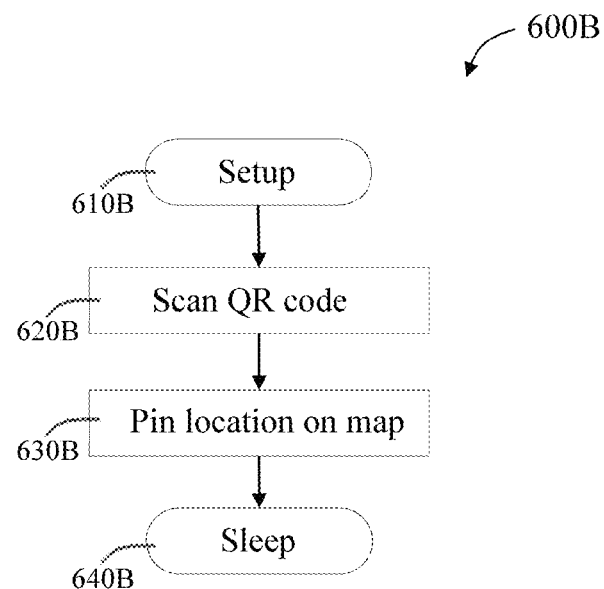
FIG. 6B is a schematic block diagram representing selected elements of a Wi-Fi network topology for use in an emergency management and monitoring platform according to one embodiment of the current disclosure.

Reference is now made to FIG. 6B, in which there is provided a flowchart representing selected actions illustrating a possible method of a setup state, which is generally indicated at 600B, for changing state to sleep mode associated with a shield control unit.

The method 600B may be triggered upon completion of BIT state, thus, the shield unit is in its initial setup mode 610B. This process is operable to connect the specific shield unit to the security backend system and locate the unit on the online map of the locality, thereafter move into sleep mode 640B.

As appropriate, the initial setup mode (step 610B) includes turning on the shield control unit; connecting the end-point shield unit to the internet via the LTE connection; and verifying valid connection to security backend system.

In step 620B—scanning the QR code (machine readable code), into the dedicated software application, where the serves as a unique identifier for each shield control unit (standalone/master), optionally using a barcode reader.

In step 630B—pinning the location of the shield control unit into the dedicated software application; and In step 640B—changing state into sleep mode once the setup procedure is completed. Completion of setup procedure incorrectly may force the system to change state to error state, indicating erroneous setup procedure, thus all operations are stopped.

Similarly, set up process for a master shield control unit, may include the following steps: running the dedicated software application at setup mode; connecting the mobile device to Wi-Fi network; connecting master unit to internet switch/hub via Ethernet connection; connecting master unit to power source; turning on the shield master unit; scanning QR code into the dedicated software application (setup mode); and configuring manually the unit location at the dedicated software application.

Additionally and similarly, set up process for a coordinator shield control unit, may include the following steps: running the software dedicated application at setup mode; connecting the coordinator unit to power source; turning on the shiled control coordinator unit; connecting the coordinator unit to internet switch/hub via Ethernet connection; Scanning the QR code into the software application (at setup mode); Configuring manually unit location at the software dedicated application; configuring the unit asa coordinator via backend control center commands; connecting the coordinator shield unit to internet via the LTE connection and further verifying valid connection to the backend system; and exiting to coordinator unit setup and enter "Sleep State" once Setup procedure is completed.

By way of example, the system software is configured with two different configurations: a coordinator (master) shield unit configuration and end-point shield unit configuration, where the system software is operable to determine the coordinator/end-point configuration at Setup State.

For the end-point shield unit, the unit may transmit and receive commands via RF communication only and the system software may send a ping, say, every 1 second. Additionally, the ping may include an ID number further include the battery status, at a period of time, say, at least once a day.

Optionally, the system software may monitor cover switch while cover is closed and send identification signal to the coordinator shield unit via RF communication when cover switch is in an open state.

Optionally, the system software is monitoring the emergency switch while switch is depressed. Accordingly, an identification signal is transmitted to the coordinator shield unit via RF communication when emergency switch is pressed.

Optionally, the system software may receive "Wakeup" command via RF communication from the coordinator shield and enter "event" state. Additionally, the software system may receive AI identification and further monitored data of the relevant sensor (such as microphone and gas and the like).

Figure 6C:
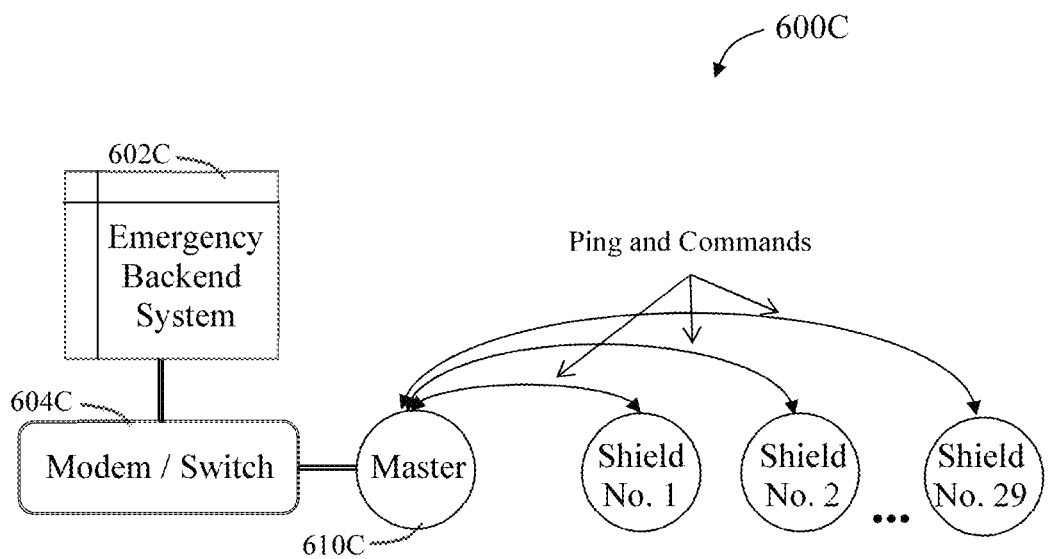
FIG. 6C is a schematic block diagram representing selected elements of a 4G/LTE network topology for use in an emergency management and monitoring platform according to one embodiment of the current disclosure.

Reference is now made to FIG. 6C, in which there is provided a schematic block diagram representing a possible RF Module Network Topology, which is generally indicated at 600C, operable in a sleep state communication architecture.

The security backend control system 602C (see also 120, FIG. 1) is operable to communicate with the associated modem/switch 604C to manage the deployment via a master shield control unit 610C. The master shield control unit 610C may receive pings from each shield control unit (shield no. 1, shield no. 2, up to shield no. 29) every, say 10 seconds, while in sleep mode. The master shield control unit 610C may transmit trigger commands to all shield units, instructing units to change mode to event mode and further control commands while in event mode, accordingly.

It is noted that the pings are communicated according to the ping protocol and may include battery status. Further, trigger commands may be received from the systems control center, or from a shield control unit when the emergency button being pressed.

Figure 6D:
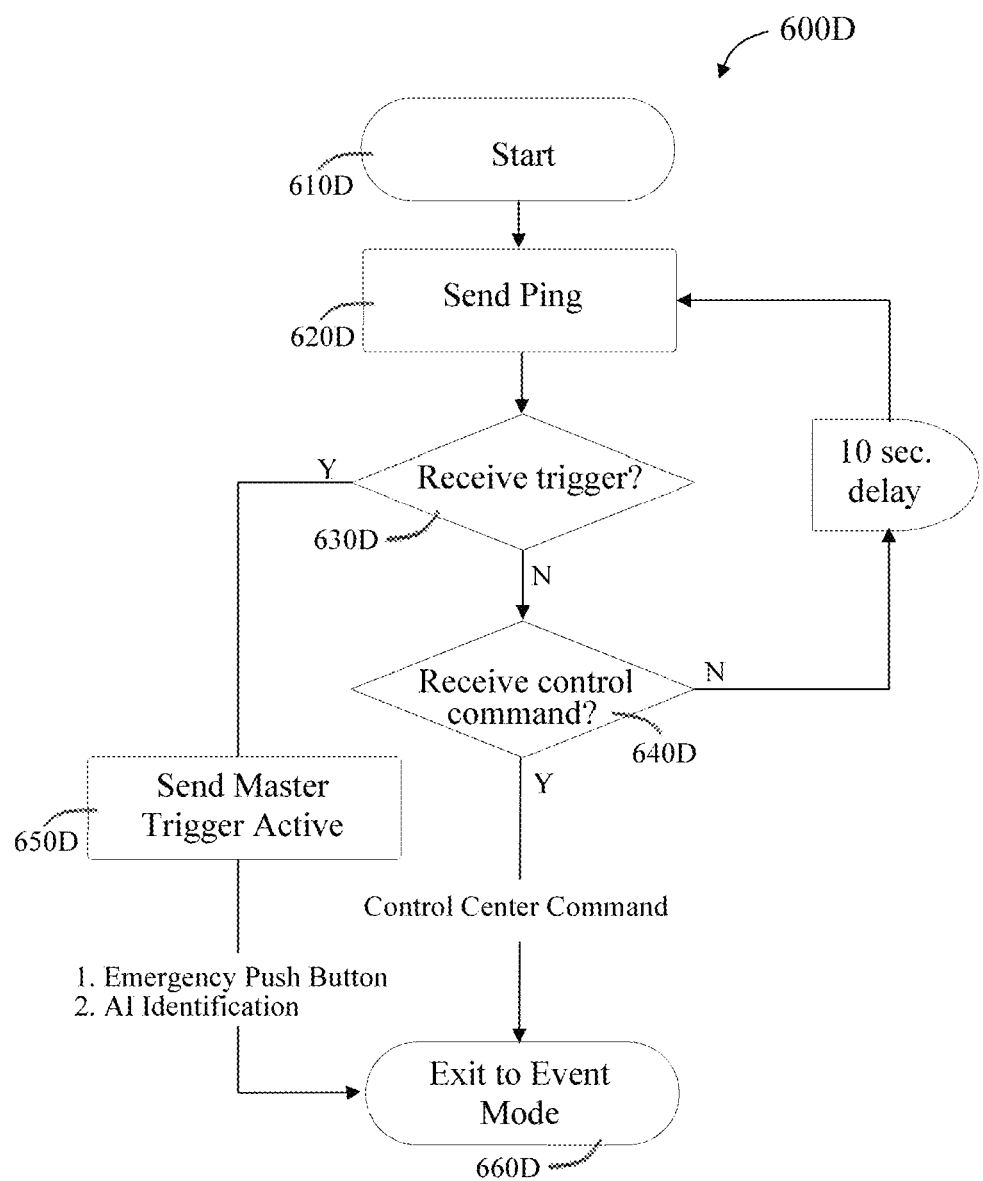
FIG. 6D is a schematic flowchart representing a method for transitioning between a standby (sleep) mode and an active (alive) mode, of a standalone shield control unit, in an emergency management system according to embodiments of the current invention.

Reference is now made to FIG. 6D, in which there is provided a flowchart representing selected actions illustrating a possible method for use on a shield unit (end point) at sleep mode, which is generally indicated at 600D, for monitoring and managing the sleep state.

The method 600D may be triggered upon completion of the setup state (as described in FIG. 6B) and entering into sleep state.

In step 610D—entering into sleep mode upon completion of associated method of setup state;

In step 620D—sending pings to the associated master shield control unit, every 10 seconds;

In step 630D—testing for a trigger indication. If no indication received (unit's emergency push button pressed/ an artificial Intelligence (AI) signal) continue for further testing;

In step 640D—testing if a control command is being received (initiated by system administrator at the systems' frontend dashboard);

In step 650D—sending to the shield's master control unit the appropriate triggering indication received; and In step 660D—exiting to event mode based upon receiving the appropriate trigger indication (step 650D) or appropriate control command (step 640D).

Figure 6E:
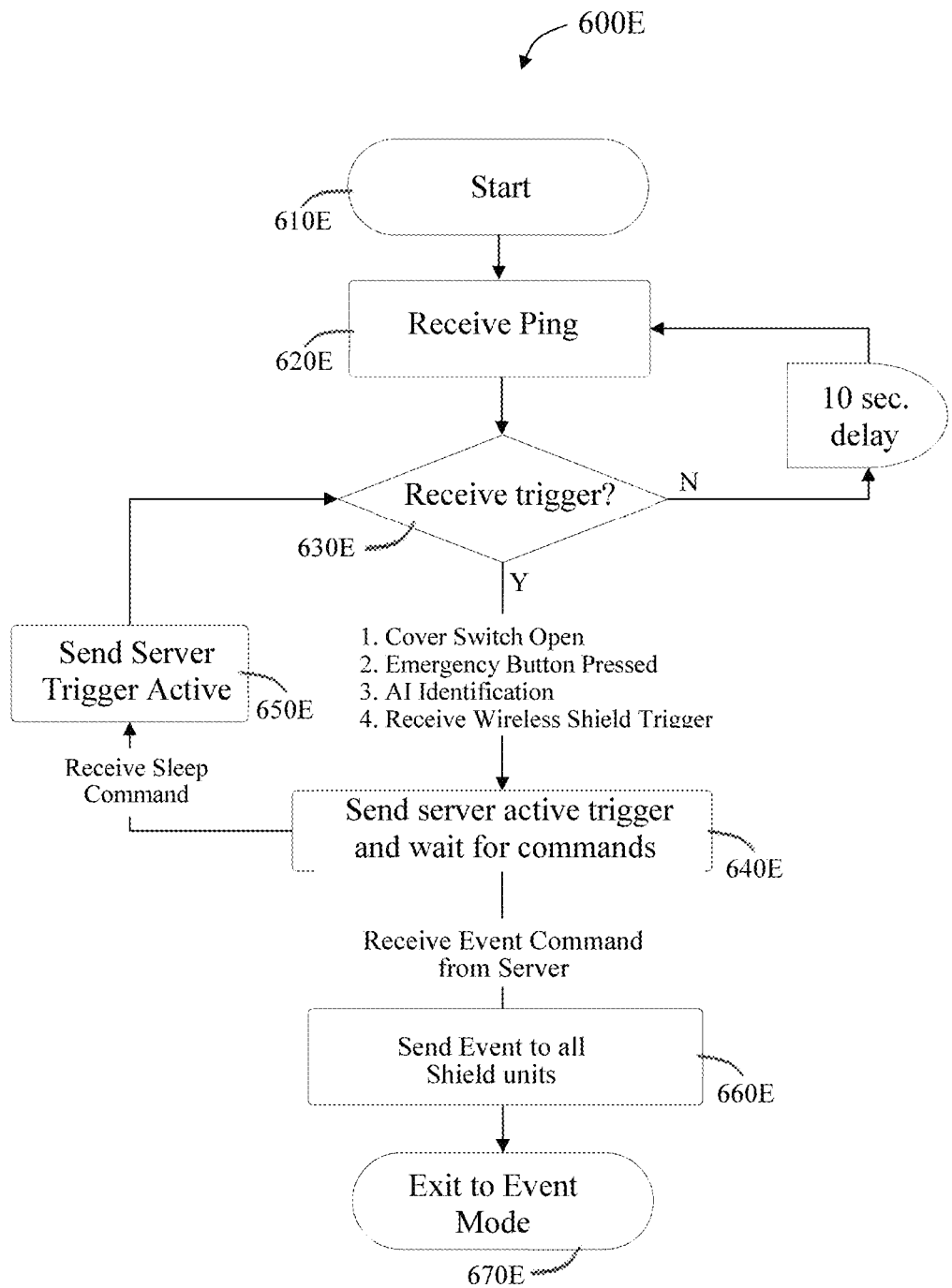
FIG. 6E is a schematic flowchart representing selected actions illustrating a possible method for use on a master shield unit at sleep mode for monitoring and managing the sleep state of an associated control unit end-point.

Reference is now made to FIG. 6E, in which there is provided a flowchart representing selected actions illustrating a possible method for use in a master shield unit (coordinator point) at sleep mode, which is generally indicated at 600E, for monitoring and managing the sleep state of an associated control unit end-point.

The method 600E may be triggered upon completion of the setup state (as described in FIG. 6B) and entering into sleep state.

It is noted that the control shield unit is operable to transmit and receive commands via RF communication and wireless internet connection.

In step 610E—entering into sleep mode upon completion of associated method of setup state;

In step 620E—receiving pings via RF communication from each shield control unit, every 10 seconds, and further transmitting the ping status, from all connected shield end-point units, via internet wire communication to the security backend system; It is noted that the system software may send a battery status, from all connected end-points shield units with ping once a day, to the security backend system;

In step 630E—testing if a trigger indication is being received (cover switch open, unit's emergency push button pressed, an artificial Intelligence (AI) signal, wireless trigger command); note that AI identification—provision for monitoring various data sensors, such as microphone, gas and the like.

In step 640E—sending backend server active trigger and wait for commands; and receiving "wakeup" command via internet wire communication from the backend server;

In step 650E—sending to the security backend server control command to move into sleep mode;

In step 660E—transmitting, by the coordinator unit software, "wakeup" command to all shield wnd-point units connected in the area;

In step 670E—exiting to event mode based upon receiving the appropriate trigger indication (step 660E).

It is noted that the software system is configured to exit sleep mode and enter error state when no communication to server is established.

Figure 7A:
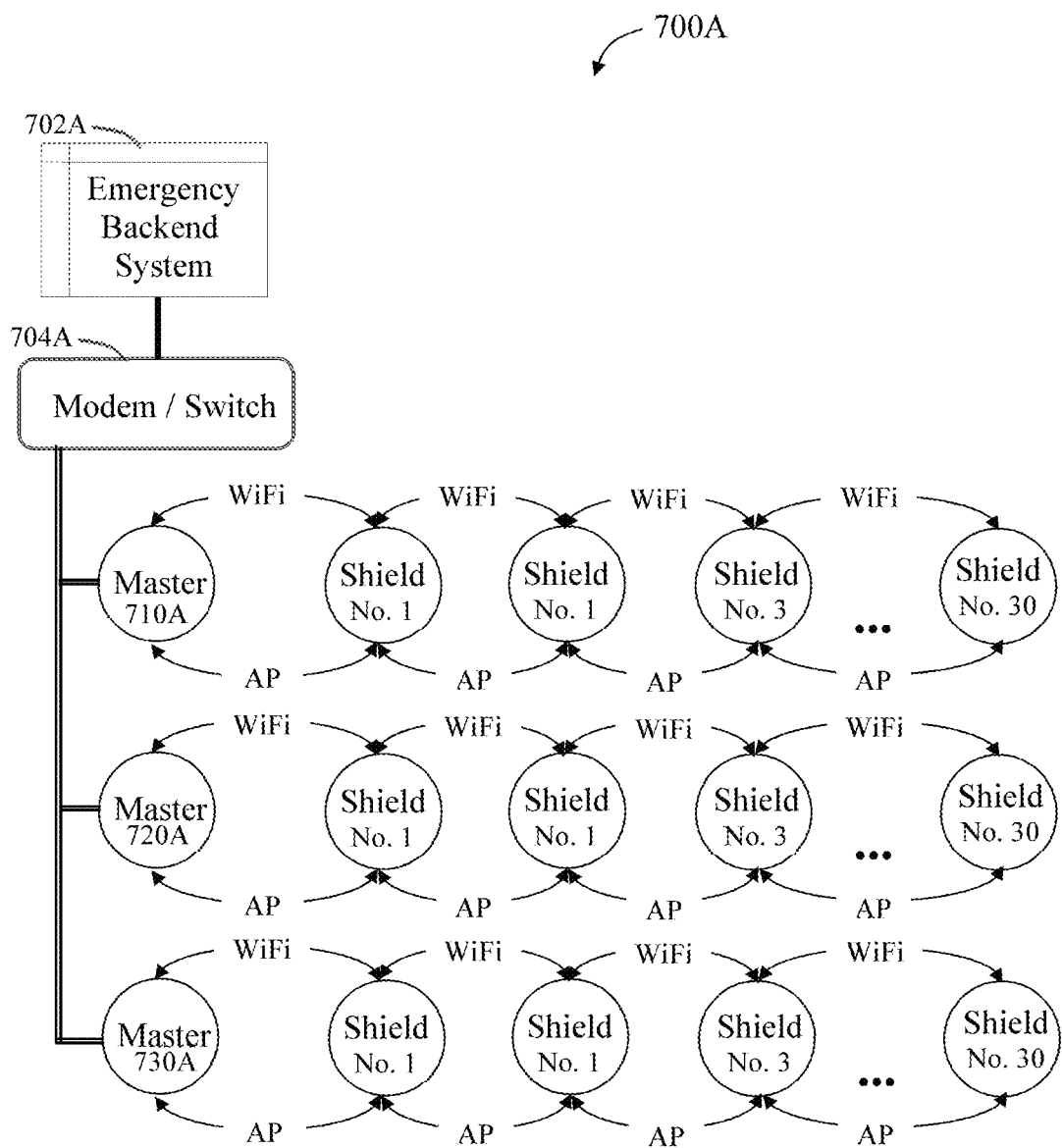
FIG. 7A is a schematic block diagram representing a possible Event State Wi-Fi Topology operable in the event state communication architecture.

Reference is now made to FIG. 7A, in which there is provided a schematic block diagram representing a possible Event State Wi-Fi Topology, which is generally indicated at 700A, operable in the event state communication architecture.

The security backend control system 702A (see also 120, FIG. 1) is operable to communicate with the associated modem/switch 704A to manage the deployment via a master shield control unit 710A, 720A, 730A, respectively. Each master shield control unit 710A, 720A, 730A may receive pings from each associated shield control unit (shield no. 1, shield no. 2, up to shield no. 30) every, say 10 seconds, while in sleep mode. Each master shield control unit 710A, 720A, 730A may transmit trigger commands to all associated shield control units, instructing the units to change mode to event mode and further transmit control commands while in event mode, accordingly.

While in event mode, the software system is operable to communicate control center command communications to all shield control units.

As appropriate, Wi-Fi network serves as a default communication to all shield control units on site.

As appropriate, 4G/LTE communication serves as a backup communication method, in case power down, for example.

As appropriate, transmitting video and audio to the security backend system, displayable in the control center upon command.

As appropriate, recording video and audio onto the internal SD memory card.

It is noted that the pings are communicated according to the ping protocol and may include battery status. Further, trigger commands may be received from the systems control center, or from a shield control unit when the emergency button being pressed.

Figure 7B:
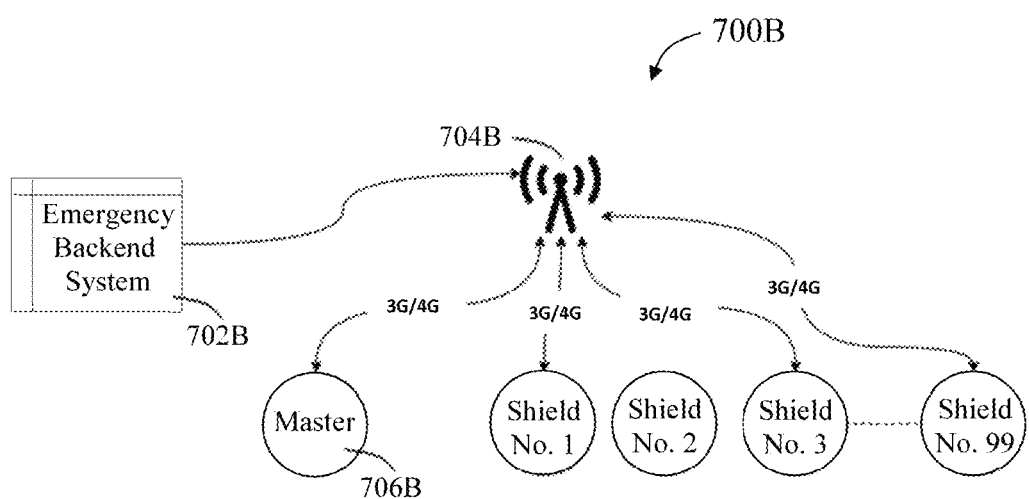
FIG. 7B is a schematic block diagram representing a possible Event State LTE Topology operable in the event state communication architecture.

Reference is now made to FIG. 7B, in which there is provided a schematic block diagram representing a possible Event State LTE Topology, which is generally indicated at 700B, operable in the event state communication architecture. As appropriate, the shield control unit is configured to enter Event State after Sleep State is interrupted by any mechanical input (pressing the push button, for example) or upon receiving server control command. Accordingly, the shield control unit will start transmitting video and audio, upon control commands of the backend system.

As appropriate, LTE (Long Term Evolution) refers to a 4G wireless communications standard.

The security backend control system 702B (see also 120, FIG. 1) is operable to communicate with the associated modem/switch 704B to manage the deployment via a master shield control unit 706B. The master shield control unit 706B may receive pings from each shield control unit (shield no. 1, shield no. 2, up to shield no. 29) every, say 10 seconds, while in sleep mode. The master shield control unit 610C may transmit trigger commands to all shield units, instructing units to change mode to event mode and further control commands while in event mode, accordingly.

It is noted that the system software is configured to use as the default connection to the security backend system using Wi-Fi connection. Accordingly, the software system is configured to establish connection to the security backend system using LTE connection in case Wi-Fi connection failed.

Figure 7C:
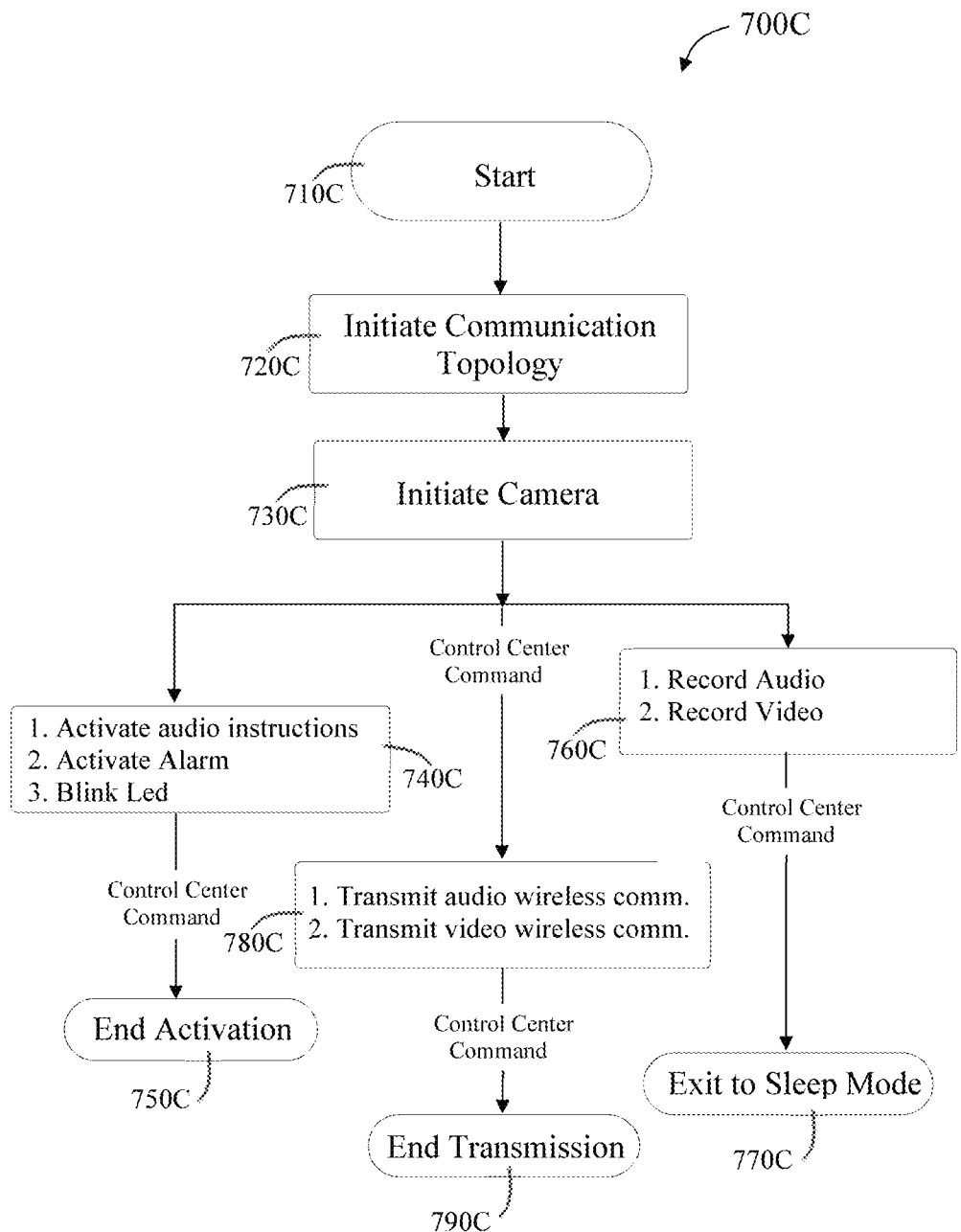
FIG. 7C is a flowchart representing selected actions illustrating a possible method for use on a shield unit at event mode for monitoring and managing a sub-locality during a security incident.

Reference is now made to FIG. 7C, in which there is provided a flowchart representing selected actions illustrating a possible method for use on a shield unit at event mode, which is generally indicated at 700C, for monitoring and managing a sub-locality during a security incident.

Where appropriate, at event state, each shield control unit is configured to receive control center command communications. Accordingly, the Wi-Fi network serves as a default communication to shields at site. 4G/LTE communication serves as a backup in case of power shutdown. Additionally, video and audio are transmitted from each shield control unit to the control center, upon request (via control commands). As appropriate, recording video and audio are saved to the internal SD card.

It is noted that the control shield unit is operable to transmit and receive commands via RF communication and wireless internet connection. The method 700C may be executed upon changing state from sleep mode via a triggering command.

Optionally, the system software is operable to turn on IR LED's at the initiation of Event state.

In step 710C—entering into event mode upon receiving a trigger indication to change state from sleep state and enter event state procedure;

In step 720C—initiating the communication topology. Accordingly, the system software may trigger SOM and initiate SOM startup and further establish end-point connection to security backend system. The software system may use default connection to security backend system using Wi-Fi connection. As appropriate, the system software may establish the connection using LTE connection, in case Wi-Fi connection failed In step 730C—initiating camera for video transmission;

In step 740C—performing the various activations, including activation of audio instructions, activating alarm, and activating LED to blink. As appropriate, the system software may blink peripheral LEDs and emergency button LEDs according to Led's activation table In step 750C—ending of the activation process, based upon receiving control center commands;

In step 760C—starting of audio and video recording, saving recorded data (audio and video) to the internal SD card;

In step 770C—changing state from event mode into sleep mode, based upon control center commands;

In step 760C—starting of audio and video recording; The system software may record audio signal to SD card memory upon entering into Event mode. Additionally or alternatively, the system software may record video signal at H.264: up to 30 fps at 720p to SD card memory upon entering into Event mode;

In step 780C—transmitting audio wireless communications and audio wireless communications, based upon request via the center control commands. Optionally, the system software may transmit video at H.264: up to 20 fps at 1920×1080 upon Gabriel server command; and In step 790C—ending transmission of audio and video, based upon request via the center control commands.

It is noted, that for video streaming, the shield control unit may transmit video according to security backend system request, where the default video format is thumbnail streaming. Where appropriate, the shield control unit may send desktop main shield streaming, upon security backend system request. Once shield is transmitting at desktop main shield format, the security backend system may change accordingly.

As appropriate, VOD transmitting to security backend system is only upon backend request. The coordinator shield unit and the first shield control unit pressed will stream video to the security backend system as appropriate.

Optionally, the software system is configured to transmit audio signals upon security backend system command.

Optionally, the software system is configured to play prerecorded audio from SD card upon security backend system command.

It is noted that the software system is configured to exit Event Mode and enter Error Mode when no communication to security backend system is established. Alternatively, the system software is exiting Event Mode and entering Sleep State upon security backend control command upon fulfilling the following tasks: turning off camera; turning off IR LED's; turning off peripheral LED's; turning off emergency button LED's; stopping of audio recording; and stopping of video recording.

Figure 8:
FIG. 8 is a dashboard screen presenting a plurality of sub-localities video displays where each display is representative of a sub-locality recorded video.

Reference is now made to FIG. 8, in which there is provided a dashboard screen presenting a video displays of a locality, which is generally indicated at 600C, where each display is representative (an educational center) of a sub-locality recorded video of each shield control unit's wide-angle camera.

For example, video display 1 displays the lobby of the educational institute, video display 7 displays the music room, video display 12 displays the media center room, video display 20 displays elevator east side, video display 23 displays room 23 and so on.

Figure 9A:
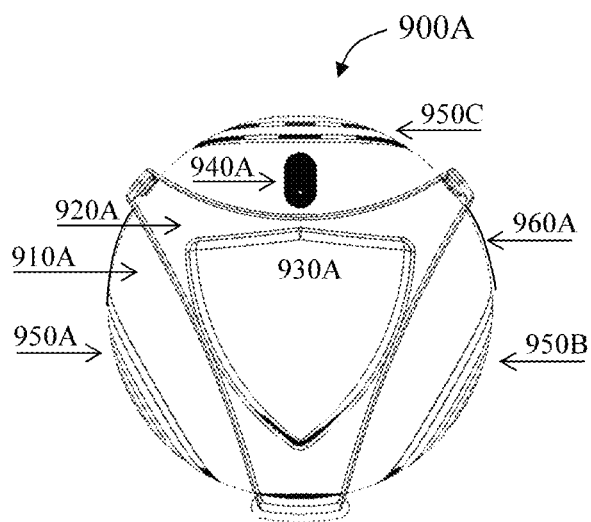
FIG. 9A-B is a front and side view, respectively, of a shield control unit operable with integrated video and audio to allow capturing of a security incident at a sub-locality real-time information.

Reference is now made to FIG. 9A, in which there is provided a front view of a shield control unit, which is generally indicated at 900A, operable with integrated video and audio to allow capturing of a security incident and providing a sub-locality real-time information.

The shield control unit 900A is designed with view of ergonomics and usability functionality for use in a crisis/terror situation. The unit configured with integrated audio and video, operable to record audio and video of its sub-locality to an internal SD card, transmit the recorded video and audio to the security backend system, by command and configured to use, by default, a Wi-Fi network as a default communication mechanism with 3G/4G/LTE communication as a backup. The shield control unit 900A is further operable for back light blinking equipped with a speaker to play buzzer every T second time interval.

The shield control unit 900A may be powered by rechargeable lithium ion batteries of 3.6 Vdc @ 13 Ah, for example, and also use external DC power supply 5 Vdc.

The shield control unit 900A consists of housing 910, a microphone sensing unit (not shown), a frame structure 920A supporting an emergency push button 930A with a transparent cover, a wide-angle camera 940A, speaker and MIC slots 950A, 950B and 950C at the top side and peripheral lights 960A. The back side of the shield control unit includes a wall mount mechanism, optionally with a slider bracket for attaching the unit onto a wall;

The shield control unit includes internally a communication unit (302, FIG. 3), a microcontroller (304, FIG. 3), a memory unit (308, FIG. 3), and a power unit component (310, FIG. 3).

Figure 9B:
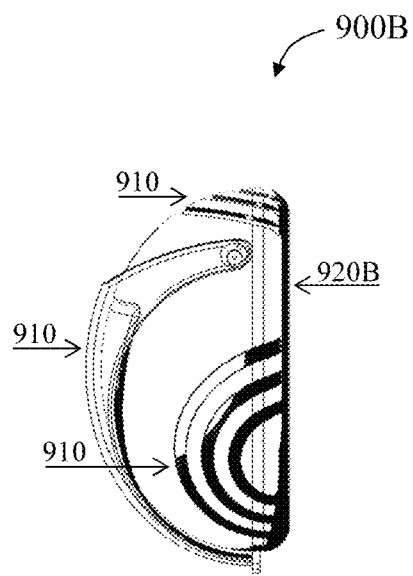

Reference is now made to FIG. 9B, in which there is provided a side view of a shield control unit, which is generally indicated at 900B, operable with integrated video and audio to allow capturing of a security incident and providing a sub-locality real-time information as described in FIG. 9A.

RF Module Protocol:

The RF module is operable to transmit communication according to the RF protocol, with constant transmission length of 3, as follows:

1) End-Point Shield Unit Synchronization

| ID | 0xAA | CHECK-SUM |
|---|---|---| where:

ID—A unique number for each end-point, with range 0-28. ID of the Coordinator is 31.

CHECKSUM—A byte contains sum of ID+0xAA without overflow.

Response from End-Point:

| ID | 0xBB | CHECK-SUM |
|---|---|---|

A remark: The response check-sum is ID+0xBB

The coordinator will send this command only when its time counter of milliseconds is 0. The received end-point will reset its counter to 0 for synchronization.

2) Status of End-Point Reading

| ID | 0xCC | CHECK-SUM |
|---|---|---|

Response from End-Point:

| ID | STATUS | CHECK-SUM |
|---|---|---|

The STATUS byte may include: 1 bit (msb) is 1 if the button was pressed, otherwise 0. (lsb—bits 0-6) contains the battery status—in percentages.

3) An Event is Occurring:

| ID | 0xDD | CHECK-SUM |
|---|---|---|

The coordinator sends this command to all end-points in case one of them response on his status with pressing event (see previous command).

Response from End-Point:

| ID | 0xEE | CHECK-SUM |
|---|---|---|

This response confirm the acceptation of the event.

Protocol Synchronization: Each end-point gets its time-slot of T time and each end-point should sleep until its time-slot which start at t=ID*T, of each PERIOD time. The shield unit shall enter Sleep state after Setup state has completed and BIT State has passed.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

What is claimed is:

1. An emergency management and monitoring platform operable to perform security event analysis of a locality comprising at least one building, said emergency management and monitoring platform comprising:
   a control unit network comprising at least one shield control unit configured to gather security event related data at a sub-locality to provide at least one event related feed;
   a security backend control system operable to communicate with said at least one shield control unit; and
   a security frontend system comprising at least one presentation dashboard operable on a computing device in communication with said security backend control system;
   wherein said emergency management and monitoring platform is operable to receive triggered indications and further to perform security analysis in an automatic manner to provide real-time monitoring and managing of at least one ongoing security incident,
   wherein said security backend control system comprises a pertinent data selection module operable to select pertinent data and to provide said pertinent data to said security frontend system such that said at least one presentation dashboard maps the region around said at lest one shield control unit and displays a simplified graphical interface of the locality,
   wherein said shield control unit is operable in at least one operation state selected from a group consisting of a startup state, a setup state, a BIT state, a sleep state, an event state, an error state and combinations thereof,
   wherein the startup state allows to activate the shield control unit,
   wherein the setup state allows to set configuration of the shield control unit,
   wherein the BIT state is operable to perform communication topology testing,
   wherein the sleep state allows transmitting of a "keep alive" signal,
   wherein the error state indicates lack of communication, and
   wherein the event state allows transferring live video, audio and sensor data to said security backend control system.

2. The emergency management and monitoring platform of claim 1, wherein said at least one shield control unit, comprises:
   a wide-angle camera having night vision capabilities, said camera operable to transmit video to said security backend control system;
   a communication unit operable to use at least one communication technology;
   a microcontroller operable to execute an installed software module;
   a power unit component operable to power said at least one shield control unit; and
   a memory unit component for storing data associated with the at least one ongoing security incident.

3. The emergency management and monitoring platform of claim 2, wherein said at least one communication technology is selected from a group consisting of: a universal asynchronous receiver-transmitter (UART) technology, Ethernet technology, Wi-Fi technology, infrared communication, ultrasonic transmission, audio transmission and combinations thereof; and wherein said computing device is selected from a group consisting of: a personal computer, a laptop computer, a tablet, a smartphone device, a portable handheld device and combinations thereof.

4. The emergency management and monitoring platform of claim 1, wherein said at least one shield control unit includes at least one audio interface.

5. The emergency management and monitoring platform of claim 4, wherein said at least one audio interface comprises at least one of:
   a microphone operable to transmit local sound to said security backend control system;
   a speaker operable to deliver messages and alarms;
   an audio signaling device selected from a group consisting of: a buzzer, a beeper, a bell, a bleeper, a chirper and combinations thereof; and
   a sonic communication channel for communicating with local communication devices.

6. The emergency management and monitoring platform of claim 1, wherein said security backend control system is operable to communicate with at least one shield control unit via at least one master shield control unit.

7. The emergency management and monitoring platform of claim 1, wherein said security backend control system is operable to communicate with said at least one shield control unit directly.

8. The emergency management and monitoring platform of claim 1, wherein said at least one shield control unit comprises at least one external interface operable to communicate with the external environment, said at least one external interface selected from a group consisting of: a mechanical interface, an electrical interface, a software interface and combinations thereof.

9. The emergency management and monitoring platform of claim 1, wherein said at least one shield control unit is configured to change into said event state upon receiving an external trigger command selected from a group consisting of:
   a mechanical command via a "panic" button mounted on said at least one shield control unit;
   an administrator initiated wireless command indication; and
   an internal Artificial Intelligence (AI) software module signal command.

10. The emergency management and monitoring platform of claim 1, wherein said at least one shield control unit is operable to provide at least one visual informational indication.

11. The emergency management and monitoring platform of claim 10, wherein said at least one visual informational indication is operable to provide at least one visual coded indication selected from a group consisting of: a color-coded light indication, a frequency coded blinking, a number of coded blinks, a duration of coded flushes and combinations thereof.

12. The emergency management and monitoring platform of claim 1, wherein said at least one shield control unit is characterized by at least one limitation selected from:
   being configured to record video and audio for storing in said memory unit;
   being accessible via a USB connector; and
   being identified by a QR code.

13. The emergency management and monitoring platform of claim 1, wherein said at least one shield control unit comprises at least one sensor selected from a group consisting of: a temperature sensor, a smoke sensor, a humidity sensor, a sound sensor, a Carbon mono-dioxide sensor, a motion sensor, a light sensor and combinations thereof.

14. The emergency management and monitoring platform of claim 1, further comprising at least one master shield control unit connectable via a dedicated software application.

15. A method for use in an emergency management and monitoring platform operable to perform field analysis of an ongoing security event at a locality comprising at least one building, in an improved manner, said emergency management and monitoring platform comprising:
   a control unit network comprising at least one shield control unit;
   a security backend control system comprising a pertinent data selection module and further operable to communicate with said at least one shield control unit; and
   a security frontend system comprising at least one presentation dashboard in communication with said security backend system, said method comprising the steps of:
   receiving a plurality of field data indications gathered by said at least one shield control unit;
   analyzing said plurality of field data indications to determine real-time occurrence of said security event at said locality; and
   selecting pertinent data for continual simplified display on said at least one presentation dashboard said pertinent data comprising navigation data enabling safe exit from said locality; wherein the step of analyzing said plurality of field data indications, comprises the steps of:
   transmitting at least one control command to said at least one shield control unit;
   receiving at least one field data indication from said at least one shield control unit;
   mapping region around said at least one shield control unit; and
   presenting continuously a simplified visual display of said locality via which a security administrator is able to control and monitor said locality.

16. A method for use in an emergency management and monitoring platform operable to perform field analysis of an ongoing security event at a locality comprising at least one building, in an improved manner, said emergency management and monitoring platform comprising:
   a control unit network comprising at least one shield control unit;
   a security backend control system comprising a pertinent data selection module and further operable to communicate with said at least one shield control unit; and
   a security frontend system comprising at least one presentation dashboard in communication with said security backend system, said method comprising the steps of:
   determining an initial setup of said emergency management and monitoring platform, by:
      distributing said shield control units network within said locality;
      determining communication configuration of associated components of said emergency management and monitoring platform;
      entering each said shield control unit into "sleep" mode;
      verifying an appropriate pinging process with each said shield control unit; and
      presenting a simplified user interface (UI) via which a security administrator is able to control and monitor the locality; and
   receiving a plurality of field data indications gathered by said at least one shield control unit;
   analyzing said plurality of field data indications to determine real-time occurrence of said security event at said locality; and
   selecting pertinent data for continual simplified display on said at least one presentation dashboard;
   wherein the step of analyzing said plurality of field data indications, comprises the steps of:
   transmitting at least one control command to said at least one shield control unit;
   receiving at least one field data indication from said at least one shield control unit;
   mapping region around said at least one shield control unit; and
   presenting continuously a simplified visual display of said locality via which a security administrator is able to control and monitor said locality.

17. The method of claim 15, wherein the step of receiving at least one field data indication, comprises at least one of the steps:
   receiving a mechanical indication triggered by pressing a "panic" button mounted on each said shield control unit;
   receiving at least one administrator wireless command indication;
   receiving at least one internal Artificial Intelligence (AI) software module indication;
   receiving at least one audio signal indication from the at least one control unit;

receiving at least one video signal indication from the at least one control unit; and receiving at least one sensor data indication.

\* \* \* \* \*